(12) United States Patent
Mehrabi et al.

(10) Patent No.: US 11,746,484 B1
(45) Date of Patent: Sep. 5, 2023

(54) CONNECTION SYSTEMS AND METHODS FOR SKEWED FRAMES

(71) Applicants: Armin Mehrabi, Miami, FL (US); Dariya Tabiatnejad, Miami, FL (US); Seyed Saman Khedmatgozar Dolati, Miami, FL (US)

(72) Inventors: Armin Mehrabi, Miami, FL (US); Dariya Tabiatnejad, Miami, FL (US); Seyed Saman Khedmatgozar Dolati, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/295,930

(22) Filed: Apr. 5, 2023

Related U.S. Application Data

(60) Provisional application No. 63/368,395, filed on Jul. 14, 2022.

(51) Int. Cl.
*E01D 2/02* (2006.01)
*E01D 19/00* (2006.01)

(52) U.S. Cl.
CPC .............. *E01D 2/02* (2013.01); *E01D 19/00* (2013.01)

(58) Field of Classification Search
CPC ..... E01D 2/02; E01D 19/00; E04C 2003/046; E04C 2003/0404; E04B 5/10; E04B 5/14
See application file for complete search history.

(56) References Cited

U.S. PATENT DOCUMENTS

| | | | | |
|---|---|---|---|---|
| 3,085,148 | A * | 4/1963 | McConnell | B23K 11/002 219/79 |
| 4,042,991 | A * | 8/1977 | Macy | E04B 5/14 52/645 |
| 4,593,509 | A * | 6/1986 | Linton | E04B 5/14 52/262 |
| 5,335,386 | A * | 8/1994 | Newell | E01D 2/02 52/263 |
| 5,454,203 | A * | 10/1995 | Turner | E04C 3/292 52/657 |
| 6,266,938 | B1 * | 7/2001 | Sheu | E04B 5/14 248/676 |
| 8,925,132 | B1 * | 1/2015 | Quinonez | E01D 2/02 14/77.1 |
| 9,777,479 | B2 * | 10/2017 | Rice | E04B 1/24 |
| 2005/0066609 | A1 * | 3/2005 | Olah | E04B 5/14 52/633 |
| 2009/0013482 | A1 * | 1/2009 | Kennedy | E01D 22/00 14/78 |
| 2009/0077758 | A1 * | 3/2009 | Vincent | E01D 22/00 14/73 |

(Continued)

*Primary Examiner* — Abigail A Risic
(74) *Attorney, Agent, or Firm* — Saliwanchik, Lloyd & Eisenschenk

(57) ABSTRACT

Connection systems and methods for connecting cross-frames to girders in skewed structure. A Tee section can be welded to a girder, and cross-frame members can be welded to the flange of the Tee section. The flange of the Tee section can have main cut-outs to separate the web of the Tee section from the flange of the girder. The flange of the Tee section can optionally have edge cut-outs for providing airflow, such as in humid regions with high potential for corrosion.

20 Claims, 9 Drawing Sheets

(56) References Cited

U.S. PATENT DOCUMENTS

2011/0067343 A1* 3/2011 Rice .................. E04C 3/07
                                                                52/655.1
2016/0305077 A1* 10/2016 Shamsai ............ E04B 5/06
2018/0347125 A1* 12/2018 Hemann ........... E01D 19/125

* cited by examiner

A) General configuration

B) Specific configuration for humid regions

| Criteria | Tee-SQ | Bent plate | Half-round bearing stiffener |
|---|---|---|---|
| Structural Performance | Good | Poor | Good |
| Durability (Corrosion protection applied) | Good | Good | Low (because of closed spaces) |
| Preparation and installation process | Easy | Moderate (requires bending) | Difficult (cutting pipe, welding and extra stiffener plate) |
| Availability of material | Good | Good | Moderate |
| Inspectability | Good | Good | Poor |
| Cost | Low | Low | High |

FIG. 8

CONNECTION SYSTEMS AND METHODS FOR SKEWED FRAMES

CROSS-REFERENCE TO RELATED APPLICATION

This application claims the benefit of U.S. Provisional Application Ser. No. 63/368,395, filed Jul. 14, 2022, the disclosure of which is hereby incorporated by reference in its entirety, including all figures, tables, and drawings.

BACKGROUND

Cross-frames are used in steel bridges to provide stability to girders during construction. They experience a variety of forces and loads and require special considerations. Normally, the cross-frames stay in place during the service life of the structure and therefore attract live load forces as well. Cross-frames and their interactions with girders must be accurately accounted for, and their connections to the girders should be designed to avoid any failures and collapses.

In the case of bridges with their axis perpendicular to the pier or abutment line (non-skewed bridges), forces in the cross-frames develop because of their contribution to lateral load distribution. Stress variation in the cross-frame members has the potential for fatigue in the cross-frame connections and the connection zone in the girders and necessitates periodic inspection for fatigue. In the case of bridges with their axis not perpendicular to the pier or abutment line (skewed bridges), forces in the cross-frames develop because of the deformation of the girders during construction and their contribution to lateral load distribution.

BRIEF SUMMARY

Embodiments of the subject invention provide connection systems and methods for connecting cross-frames (e.g., end cross-frames) to girders in skewed structures (e.g., skewed bridges). A Tee section can be welded to a girder, and cross-frame members can be welded to the flange of the Tee section. The flange of the Tee section can have main cut-outs to separate the web of the Tee section from the flange of the girder. The flange of the Tee section can optionally have edge cut-outs for providing airflow (e.g., in humid regions with high potential for corrosion). In cases where a length of the flange of the Tee section is insufficient for connection with the cross-frame members, one or more connection plates can be welded to the Tee section flange and the cross-frame members.

In an embodiment, a system for connecting a cross-frame to a girder (e.g., in a skewed structure such as a skewed bridge) can comprise a first Tee section welded (e.g., welded directly with no other elements therebetween) to the girder and comprising a first Tee section web and a first Tee section flange (monolithically formed with the first Tee section web or connected directly with the first Tee section web). The first Tee section web can be welded (e.g., welded directly) to a girder web of the girder; the first Tee section flange can be welded (e.g., welded directly) to the girder web and/or welded (e.g., welded directly) to a girder flange of the girder; and/or the first Tee section web can be physically spaced apart from the girder flange by a first Tee section main cut-out. The system can further comprise at least one first cross-frame member connected by welding (e.g., welded directly, or welded to a connection plate that is welded directly) to the first Tee section flange. The system can further comprise a first connection plate welded (e.g., welded directly) to the first Tee section flange, and at least one first cross-frame member can be welded (e.g., welded directly) to the first connection plate. The girder can be a bridge girder of a skewed bridge. An angle between the first Tee section flange and a plane perpendicular to the girder web can be equal to a skew angle between an end support of the skewed bridge and a line perpendicular to a longitudinal axis of the skewed bridge. The first Tee section web can comprise a plurality of edge cut-outs along a first edge of the first Tee section web, the first edge of the first Tee section web being perpendicular to a surface of the girder flange to which the first Tee section flange is directly welded. The girder can be an external girder of a skewed bridge, and a surface of the girder web to which the first Tee-section web is directly welded can be an internal-facing girder web surface (the external-facing surface of the girder web can have no Tee section attached thereto). The girder can alternatively be an internal girder of a skewed bridge, and the first Tee section web can be welded (e.g., welded directly) to a first surface of the girder web of the girder, with the first Tee section flange being welded (e.g., welded directly) to the first surface of the girder web; the system can further comprise a second Tee section welded (e.g., welded directly) to the girder and comprising a second Tee section web and a second Tee section flange monolithically formed with the second Tee section web or connected directly with the second Tee section web, with the second Tee section web being welded (e.g., welded directly) to a second surface of the girder web opposite from the first surface of the girder web, the second Tee section flange being welded (e.g., welded directly) to the second surface of the girder web and/or welded (e.g., welded directly) to the girder flange of the girder, and/or the second Tee section web being physically spaced apart from the girder flange by a second Tee section main cut-out. The system can further comprise at least one first cross-frame member connected by welding (e.g., welded directly, or welded to a first connection plate that is welded directly) to the first Tee section flange and at least one second cross-frame member connected by welding (e.g., welded directly, or welded to a second connection plate that is welded directly) to the second Tee section flange. A first angle between the first Tee section flange and a plane perpendicular to the girder web can be equal to the skew angle between an end support of the skewed bridge and a line perpendicular to a longitudinal axis of the skewed bridge, and a second angle between the second Tee section flange and the plane perpendicular to the girder web can be equal to the skew angle. The first Tee section web can comprise a plurality of first edge cut-outs along the first edge of the first Tee section web, and the second Tee section web can comprise a plurality of second edge cut-outs along a second edge of the second Tee section web, the second edge of the second Tee section web being perpendicular to a surface of the girder flange to which the second Tee section flange is directly welded.

In another embodiment, a method for connecting a cross-frame to a girder (e.g., in a skewed structure such as a skewed bridge) can comprise: welding (e.g., welding directly) a first Tee section to the girder, the first Tee section comprising a first Tee section web and a first Tee section flange monolithically formed with the first Tee section web or connected directly with the first Tee section web. The first Tee section web can be welded (e.g., welded directly) to a girder web of the girder; the first Tee section flange can be welded (e.g., welded directly) to the girder web and/or welded (e.g., welded directly) to a girder flange of the girder; and/or the first Tee section web can be physically spaced apart from the girder flange by a first Tee section main cut-out. The method can further comprise connecting by welding (e.g., welding directly, or welding to a connection plate that is welded directly) at least one first cross-frame member to the first Tee section flange. The girder can be a bridge girder of a skewed bridge, and an angle between the first Tee section flange and a plane perpendicular to the girder web can be equal to a skew angle between an end support of the skewed bridge and a line perpendicular to a longitudinal axis of the skewed bridge. The first Tee section web can comprise a plurality of edge cut-outs along a first edge of the first Tee section web, the first edge of the first Tee section web being perpendicular to a surface of the girder flange to which the first Tee section flange is directly welded. The girder can be, for example, an internal girder of a skewed bridge, with the first Tee section web being welded (e.g., welded directly) to a first surface of the girder web of the girder and the first Tee section flange being welded (e.g., welded directly) to the first surface of the girder web; the method can further comprise welding (e.g., welding directly) a second Tee section to the girder, the second Tee section comprising a second Tee section web and a second Tee section flange monolithically formed with the second Tee section web or connected directly with the second Tee section web, with the second Tee section web being welded (e.g., welded directly) to a second surface of the girder web opposite from the first surface of the girder web, the second Tee section flange being welded (e.g., welded directly) to the second surface of the girder web and welded (e.g., welded directly) to the girder flange of the girder, and/or the second Tee section web being physically spaced apart from the girder flange by a second Tee section main cut-out. The method can further comprise connecting at least one first cross-frame member by welding (e.g., welding directly, or welding to a first connection plate that is welded directly) to the first Tee section flange and connecting at least one second cross-frame member by welding (e.g., welding directly, or welding to a second connection plate that is welded directly) to the second Tee section flange by welding. A first angle between the first Tee section flange and a plane perpendicular to the girder web can be equal to a skew angle between an end support of the skewed bridge and a line perpendicular to a longitudinal axis of the skewed bridge, and a second angle between the second Tee section flange and the plane perpendicular to the girder web can be equal to the skew angle.

BRIEF DESCRIPTION OF DRAWINGS

FIG. 8 shows a table with a comparison of connection systems for end cross-frame skewed bridges.

DETAILED DESCRIPTION

Figure 1:
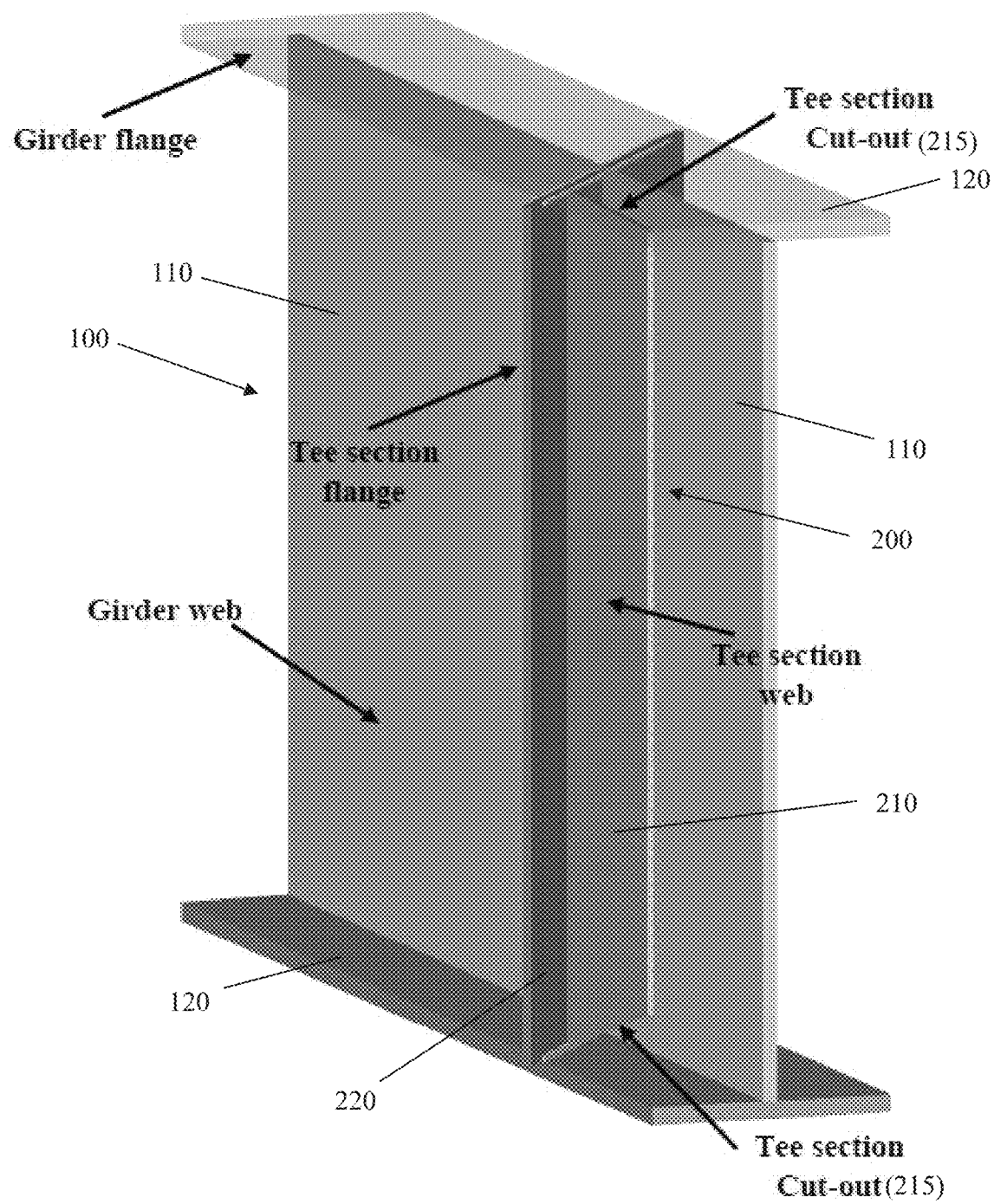
FIG. 1 shows a perspective view of a tee section on a girder, according to an embodiment of the subjection invention.

Embodiments of the subject invention provide connection systems and methods for connecting cross-frames (e.g., end cross-frames) to girders in skewed structures (e.g., skewed bridges). A Tee section can be welded to a girder, and cross-frame members can be welded to the flange of the Tee section. The flange of the Tee section can have main cut-outs to separate the web of the Tee section from the flange of the girder. The flange of the Tee section can optionally have edge cut-outs for providing airflow (e.g., in humid regions with high potential for corrosion). In cases where a length of the flange of the Tee section is insufficient for connection with the cross-frame members, one or more connection plates can be welded to the Tee section flange and the cross-frame members.

Compared to non-skewed bridges, the live load effects and fatigue issues are exacerbated in skewed bridges because the skewness of the supports creates a different structural response, adding to the effect of live load. When a truck moves along the bridge, because of the shift of span for adjacent girders, deflection of girders under live load is different and subjects the cross-frames to additional repetitive live load forces. Twisting of cross-frames (intermediate or end) has a distortion effect that is especially degrading to connections that are already fatigue-sensitive. Also, for the end cross-frames, the connection of cross-frame members to the girder should be established inclined with respect to the girder web plane, compounding the fatigue issues, in particular of the slanted connection.

Various related art systems have been implemented for connecting end cross-frame members to girders. However, these related systems have shortcomings that have limited their applications, and such limitations include the need for significant preparation, availability of appropriate materials, high cost for the fabrication and assembly, time-consuming procedure, corrosion susceptibility, and, most importantly, fatigue issues. This has generated a demand for an alternative connection type that is durable, economical, fast to install, and able to offer a better solution concerning fatigue as well as material availability in stock. Embodiments of the subject invention provide connection systems for connecting cross-frames (e.g., end cross-frames) to girders in skewed structures (e.g., skewed bridges).

The connection system of embodiments of the subject invention, which can be referred to as the Tee-SQ system or Tee-SQ connection system, is an innovative alternative to related art systems and methods to connect cross-frame members (e.g., end cross-frame members) to girders (e.g., steel girders) in skewed structures (e.g., skewed bridges). Although the application of the connection system is described in detail herein with respect to bridges, this is for exemplary purposes only and should not be construed as limiting. The systems and methods described herein can also be used (potentially with minor modifications in certain cases) for skewed connections in any structure (e.g., any steel-frame structure).

FIG. 1 shows a perspective view of a connection system according to an embodiment of the subject invention. Referring to FIG. 1, a Tee section 200 can be used as the main connection element. The Tee section web 210 may require shortening to provide the required skew angle. The Tee section web 210 can be cut near the top and/or bottom flanges 120 of the girder 100, providing one or more Tee section main cut-outs 215. The flange 220 of the Tee section 200 can be welded 400 at the interface with the flange 120 of the girder 100 and at the interface with the web 110 of the girder 100. The web 210 of the Tee section 200 can be welded 400 at the interface with the web 110 of the girder 100, but is not welded to the flange 120 of the girder 100. Due to the main cut-outs 215, the web 210 of the Tee section 200 can be spaced apart from the flange 120 of the girder 100. In many embodiments, the material of the girder 100 and/or the Tee section 200 can comprise steel or can be steel.

Figure 2:
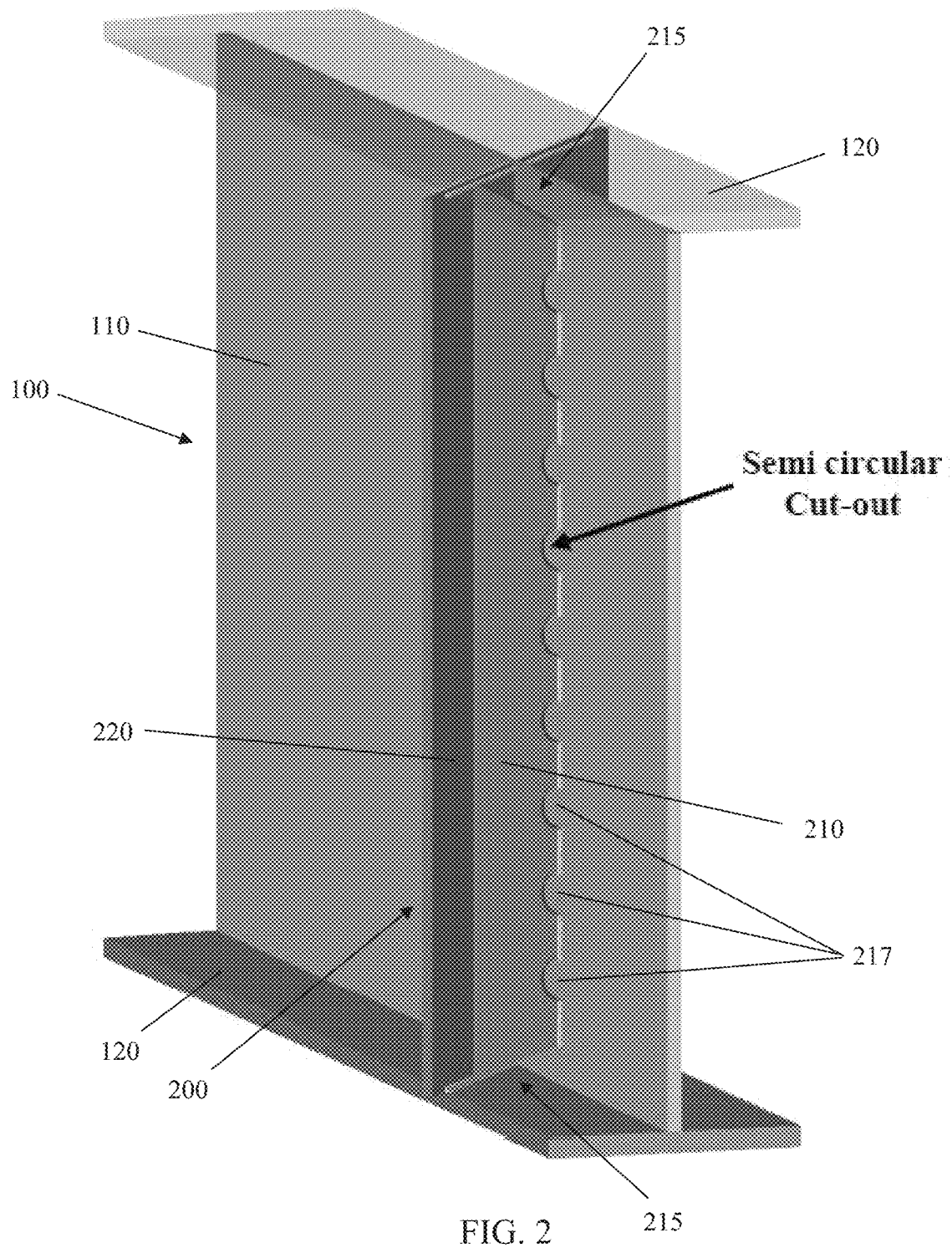
FIG. 2 shows a perspective view of a tee section on a girder, according to an embodiment of the subjection invention, where the web of the tee section has cut-outs.

FIG. 2 shows a further embodiment configured for humid regions with high potential for corrosion, in which edge cut-outs 217 along an edge of the Tee section web 210 can be utilized to provide airflow. The edge cut-outs 217 can be semi-circular cut-outs, though embodiments are not limited thereto. The remainder of the connection system can be the same as that in FIG. 1, other than the edge cut-outs 217.

Figures 3A, 3B:
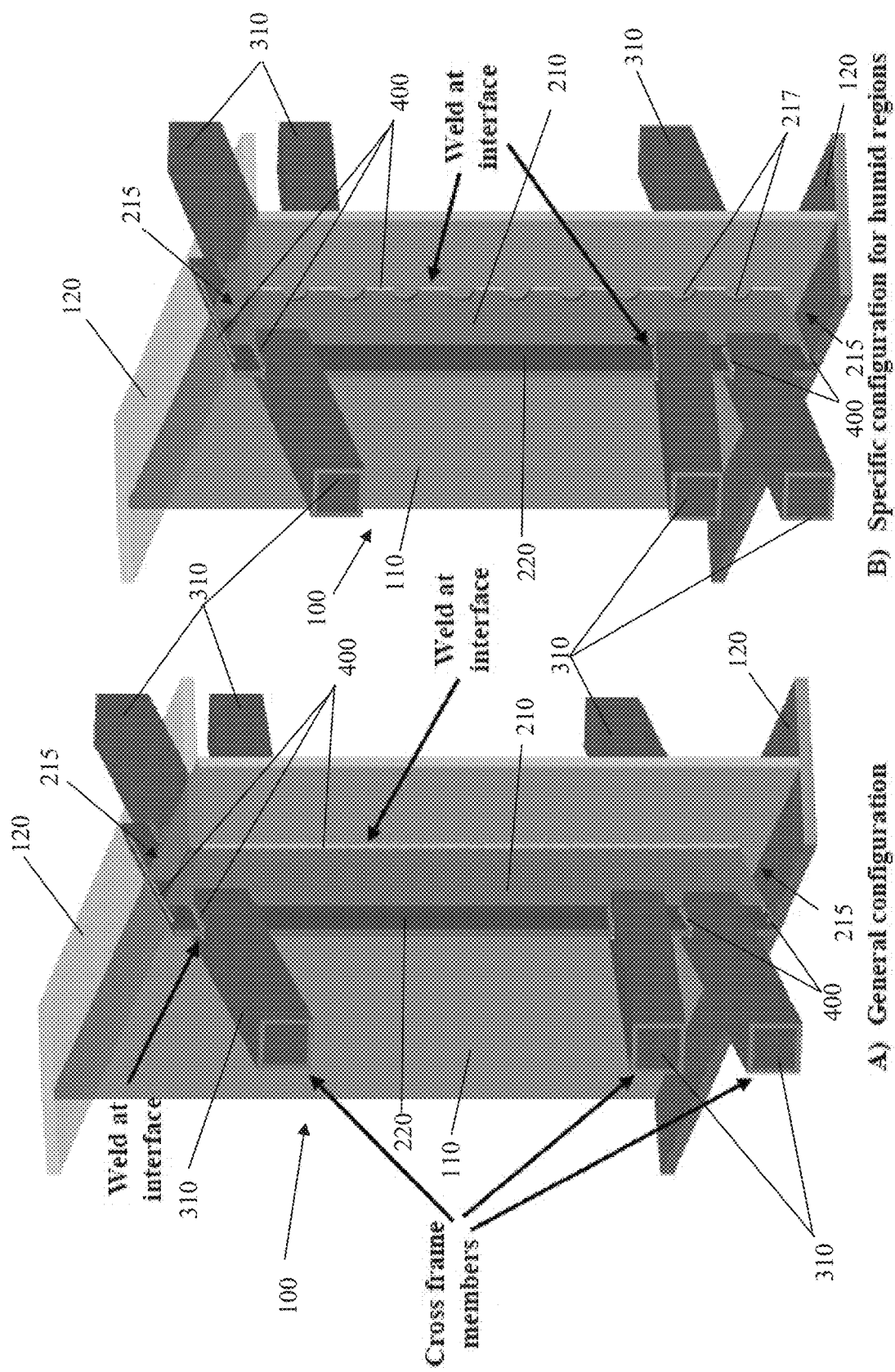
FIG. 3A shows a perspective view of a tee section on a girder with cross-frame members attached to the tee section, according to an embodiment of the subjection invention.
FIG. 3B shows a perspective view of a tee section on a girder with cross-frame members attached to the tee section, according to an embodiment of the subjection invention, where the web of the tee section has cut-outs.

FIG. 3A shows a connection system, according to an embodiment of the subject invention, with cross-frame members connected thereto. Referring to FIG. 3A, the cross-frame members 310 can be welded 400 to the flange 220 of the Tee section 200 in at least one location. In the case of an internal girder 100, cross-frame members 310 of a cross-frame 300 can be welded 400 to the flange 220 of a Tee section 200 on both sides of the girder 100 (see also FIG. 4). In the case of an external girder 100, cross-frame members 310 may be welded 400 to the flange 220 of a Tee section 200 on only one side (e.g., an internal side) of the girder 100 (and the Tee section 200 may only be provided on that side of the girder 100). FIG. 3B shows a further embodiment including edge cut-outs 217. The remainder of the connection system in FIG. 3B can be the same as that in FIG. 3A, other than the edge cut-outs 217. In many embodiments, the material of the girder 100, the Tee section 200, and/or the cross-frame members 310 can comprise steel or can be steel.

Figure 4:
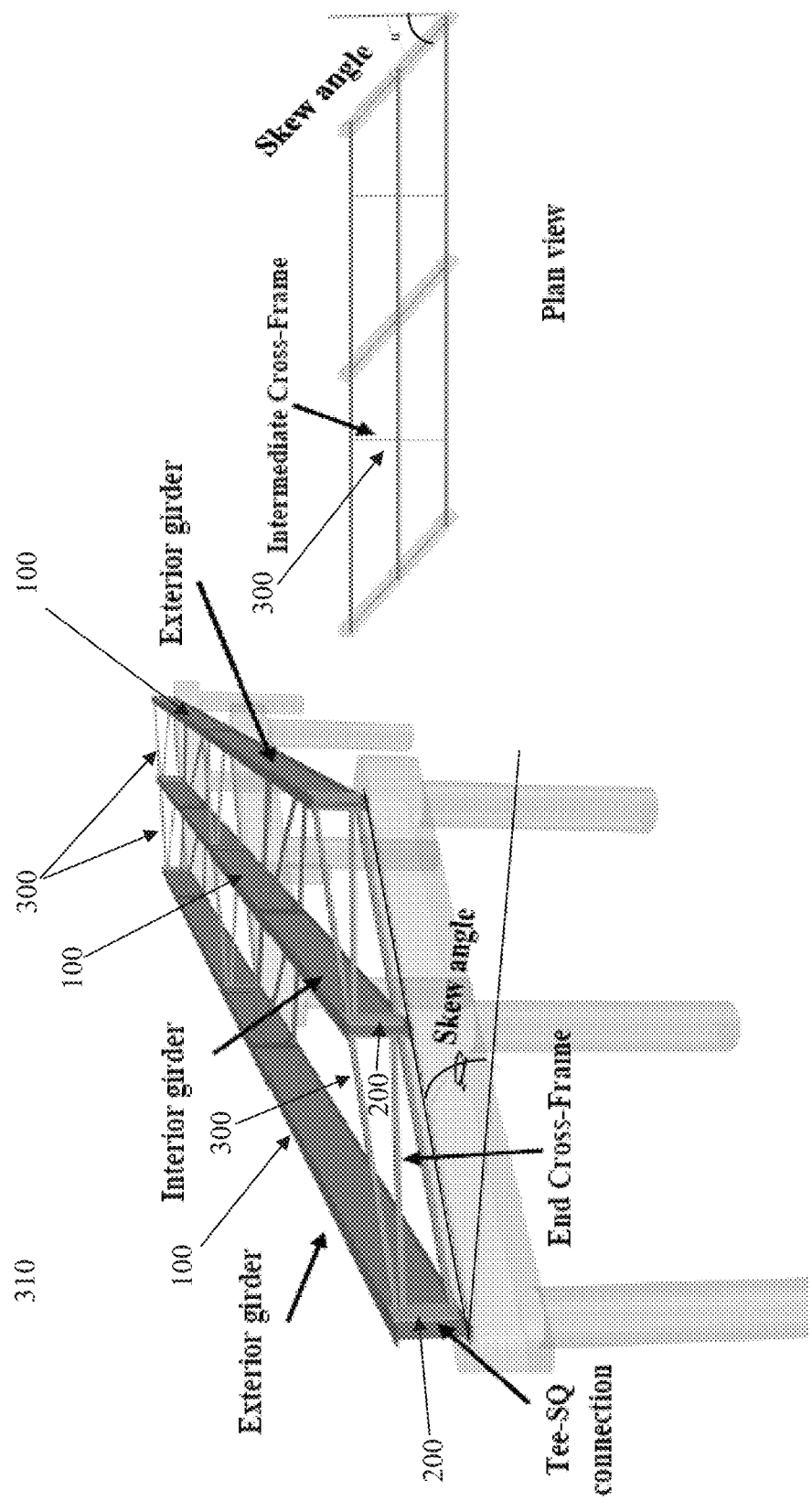
FIG. 4 shows a perspective view of a tee section connection system in a skewed bridge, according to an embodiment of the subject invention. The right-hand portion of FIG. 4 shows a plan view of an intermediate cross-frame.

FIG. 4 shows a perspective view of a tee section connection system in a skewed bridge, according to an embodiment of the subject invention. The right-hand portion of FIG. 4 shows a plan view of an intermediate cross-frame. Referring to FIG. 4, the positioning of the connection system in the skewed bridge can be seen, as can the skew angle α. The connection system can be implemented on both sides of interior girders 100, while the connection system may be implemented on only one side of the exterior girders 100.

The edge cut-outs 217, if present, can help prevent or inhibit accumulation of moisture or water between the Tee section 200 and the girder 100 (closed space), inhibiting excessive corrosion in the connection system and providing inspectability. The quantity and locations of the edge cut-outs 217 can be decided on a case-by-case basis (e.g., by a designer or engineer) to provide for adequate exposure and proper stress distribution.

Figure 5A:
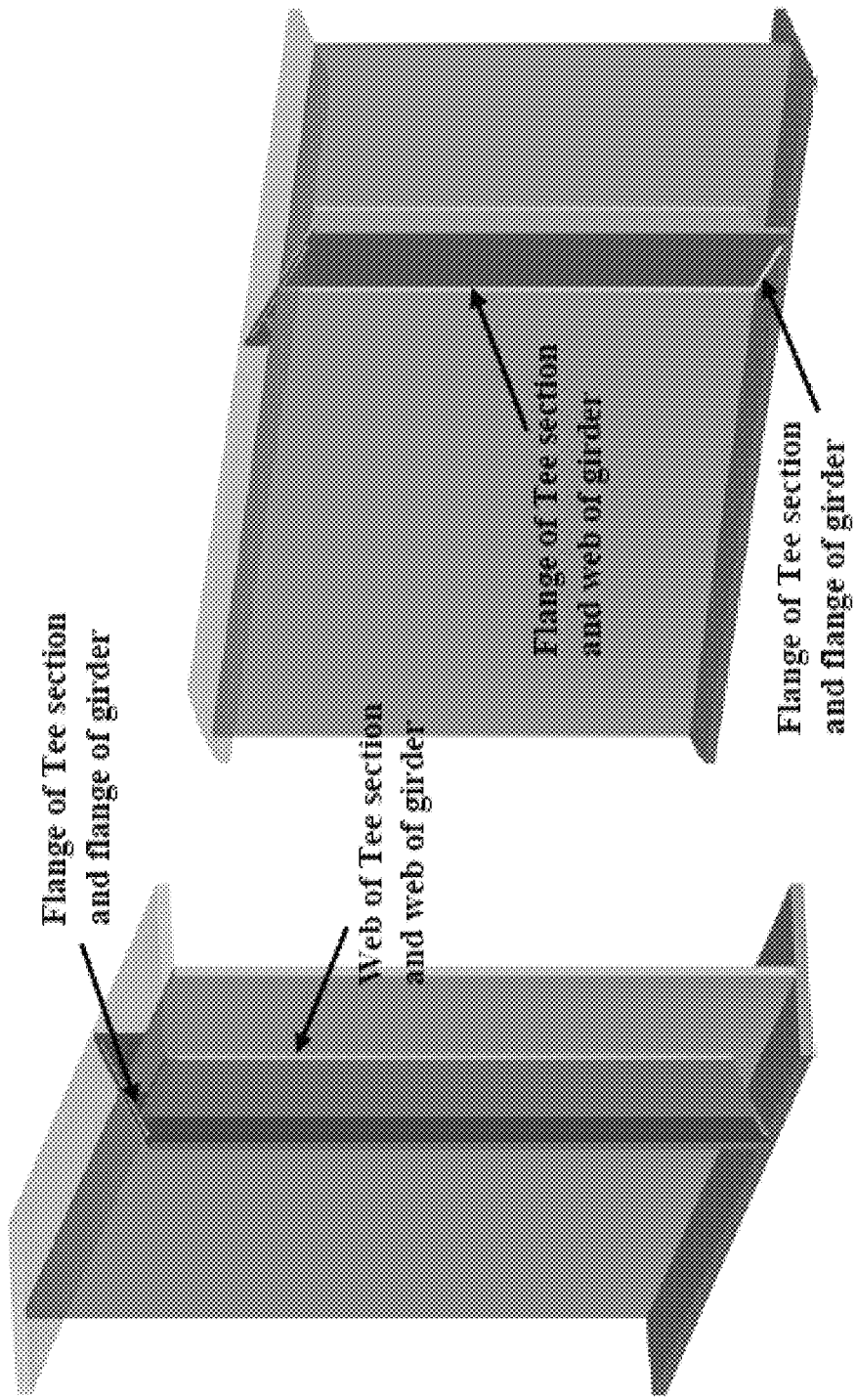
FIG. 5A shows perspective views of a tee section on a girder, according to an embodiment of the subjection invention.
Figure 5B:
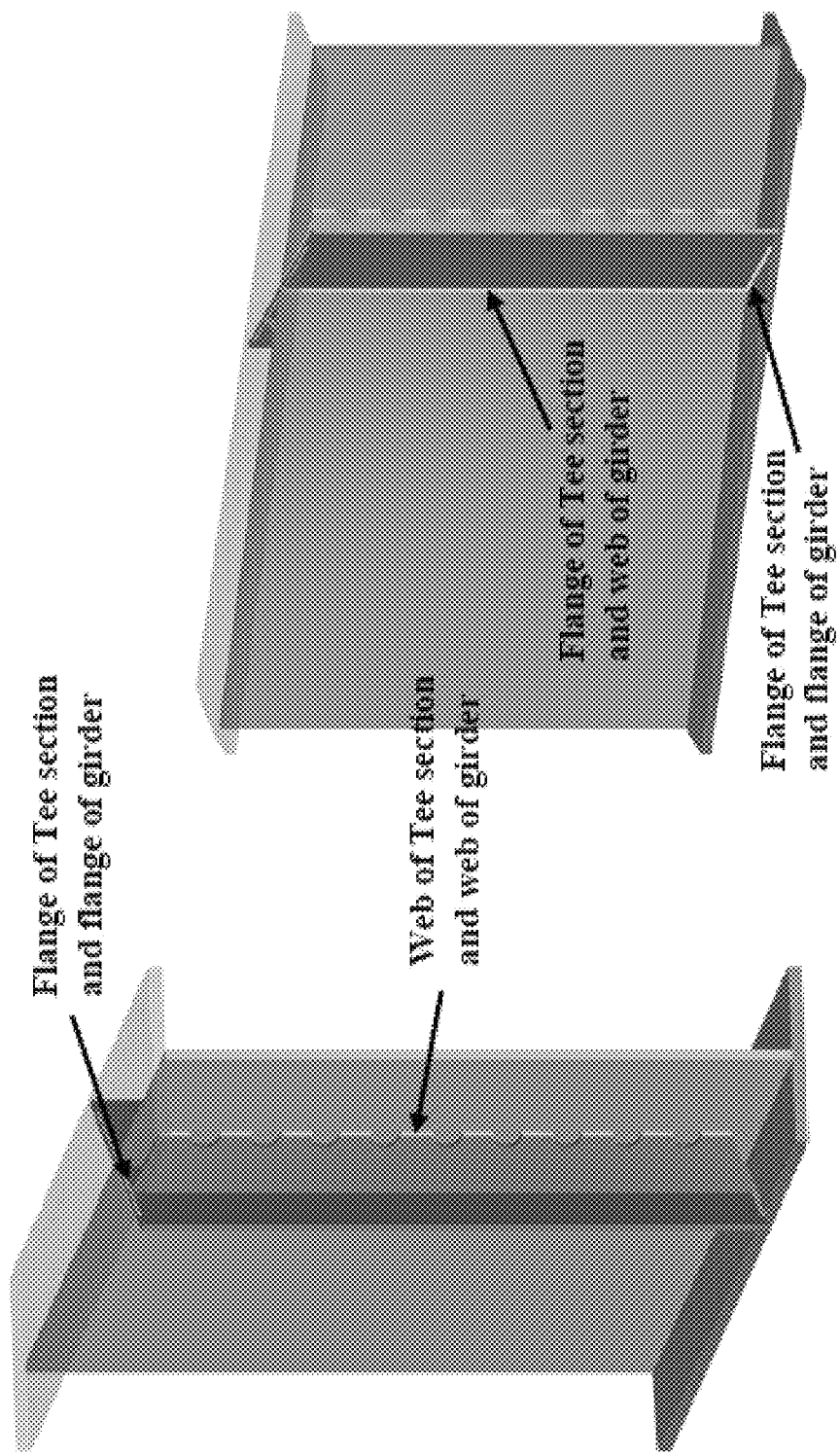
FIG. 5B shows perspective views of a tee section on a girder, according to an embodiment of the subjection invention, where the web of the tee section has cut-outs.

Referring to FIGS. 5A and 5B, proper welding can be performed wherever the Tee section 200 touches the girder 100. In many embodiments, the Tee section 200 will have the following interfaces with the girder 100: web 210 of Tee section 200 and web 110 of girder 100; flange 220 of Tee section 200 and web 110 of girder 100; and flange 220 of Tee section 200 and flange 120 of girder 100. In many embodiments, the web 210 of the Tee section 200 does not touch the flange 120 of the girder 100. This configuration is especially advantageous for fatigue behavior of the connection system as the tension flange 220 is not fully constrained during bending.

Figure 6:
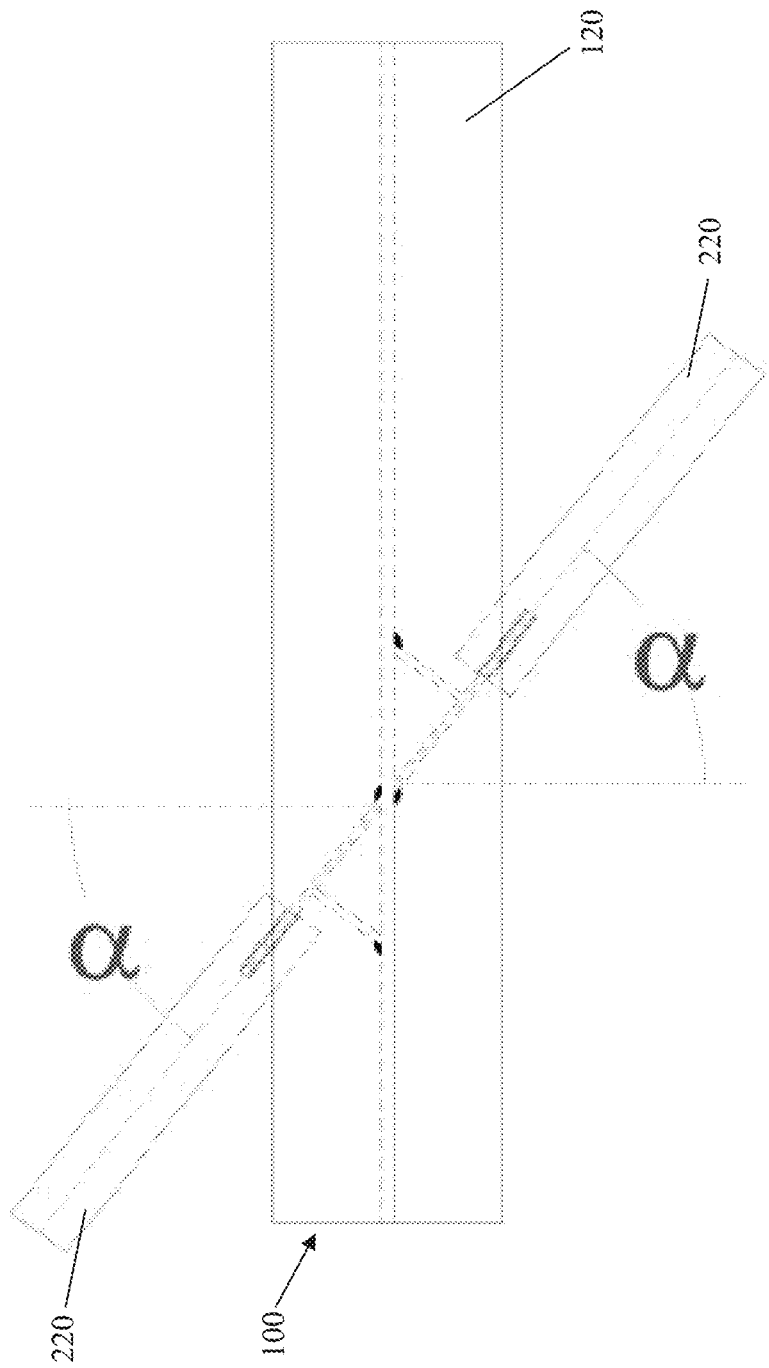
FIG. 6 shows a top view of a tee section connected to a girder, according to an embodiment of the subject invention, showing the skew angle (a).

Referring to FIG. 6, the skew angle α is the angle between the alignment of an intermediate or end support of a bridge (or other structure) with respect to a line perpendicular to the bridge (or other structure) longitudinal axis (see also FIG. 4). The skew angle α corresponds to the angle between the flange 220 of the Tee section 200 and a plane perpendicular to the web 110 of the girder 100.

Figures 7A, 7B:
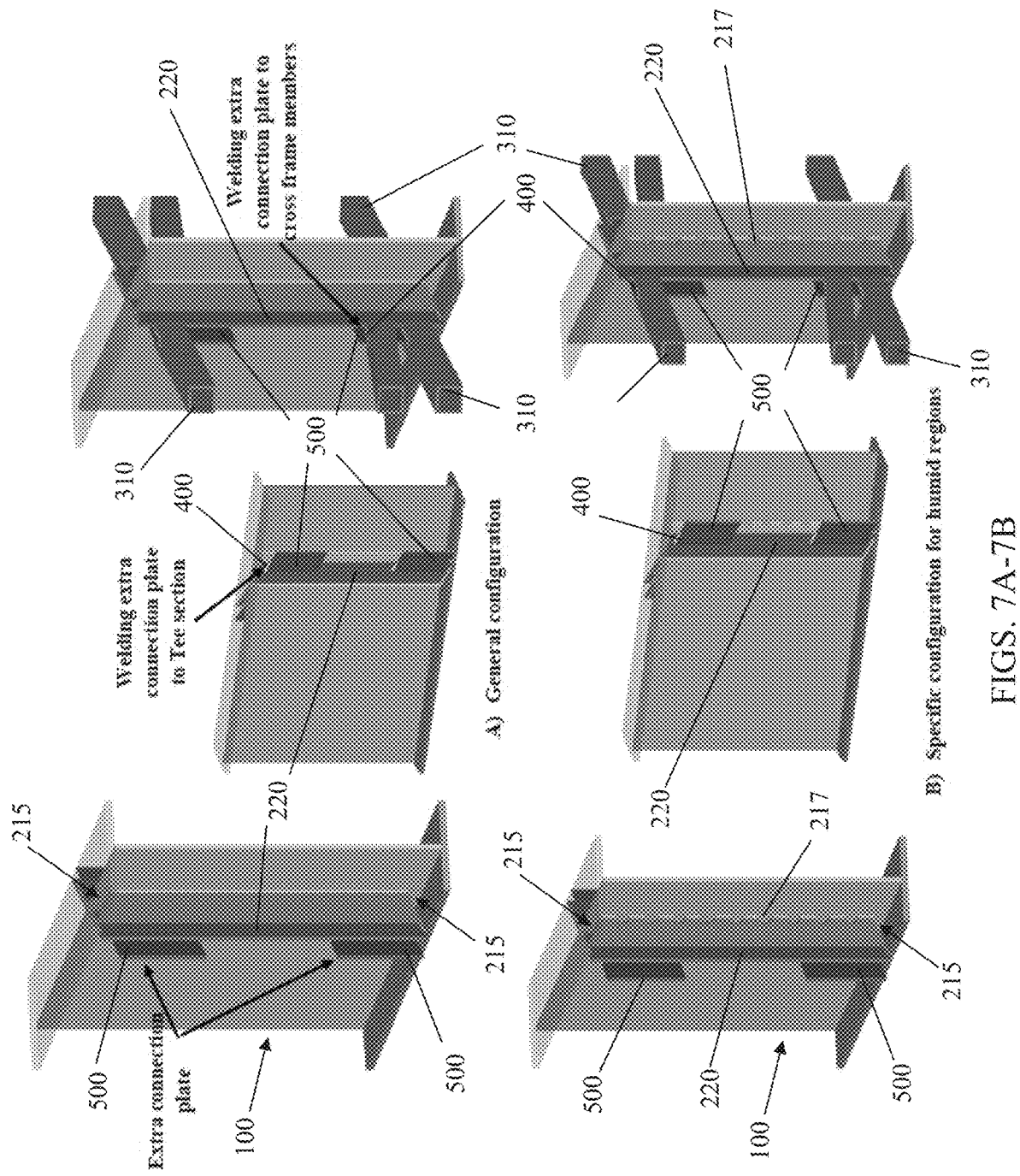
FIG. 7A shows perspective views of a tee section on a girder, according to an embodiment of the subjection invention, where connection plates are attached to the flange of the tee section. The view in the right-hand portion of FIG. 7A also shows cross-frame members attached to the connection plates.
FIG. 7B shows perspective views of a tee section on a girder, according to an embodiment of the subjection invention, where connection plates are attached to the flange of the tee section and where the web of the tee section has cut-outs. The view in the right-hand portion of FIG. 7B also shows cross-frame members attached to the connection plates.

The cross-frame members 310 can be connected to the flange 220 of the Tee section 200 using proper welding 400. In cases where the length of the Tee section flange 220 is not adequate to provide the required weld length to attach the cross-frame members 310, one or more connection plates 500 can be used, as shown in FIGS. 7A and 7B. The connection plate 500 can be welded 400 to the Tee section flange 220 and to the respective cross-frame member 310.

In an embodiment, a method of connecting cross-frames to girders in a skewed structure can include providing a connection system as disclosed herein, and using the connection system to connect the cross-frames to the girders.

Embodiments of the subject invention provide several advantages over related art systems and methods, including: use of materials that are readily available (e.g., steel); use of materials that are compatible with the existing girder and cross-frame material (e.g., steel); ease of fabrication and installation; fewer fatigue-sensitive weld connection details; less stress concentration; less residual stresses; lower cost; better inspectability; and better and simpler corrosion protection (e.g., using edge cut-outs). As shown in FIG. 8, embodiments of the subject invention (in the column labeled "Tee-SQ") show improvements in comparison to bent plate and half-round bearing stiffener connections, which are common in the related art. Referring to FIG. 8, structural performance refers to the capacity and performance of the connection systems in developing the structural requirements; durability (corrosion resistance) refers to the performance of the connection system in corrosive areas such as marine environments, and considers that the connection elements will be applied with an appropriate coating or other corrosion protection methods; preparation and installation process refers to whether the connection system is a rapid, safe, and labor-friendly method of construction at the site or fabrication factory; availability of material refers to the amount and availability of materials for the fabrication of the connection systems; inspectability refers to the ability and accessibility of inspecting the connection system for possible defects; and cost refers to both the labor cost and prices of equipment used in the connection system.

One of the major concern for any cross-frame connection (intermediate and end) is the fatigue strength. Although the welding of the cross-frame connection (embodiments of the subject invention and related art connections) to the girder flange has been construed as having negative effect with regard to fatigue behavior, the inventors have found that this issue is nonexistent for the end-cross frame connection in embodiments of the subject invention for the following reason. According to the NCHRP Report 102 (see Fisher et al., Effect of weldments on the fatigue strength of steel beams, 1970, TRB; which is hereby incorporated by reference herein in its entirety), fatigue strength at connections mostly relies on stress range. Experiments have shown that other variables such as the strength of the parent material, minimum stress, and size variation have a minor effect on fatigue strength in welded joints and that they can be ignored (see Gurney, Cumulative damage of welded joints, 2006, Woodhead Publishing; and Fisher et al., Fatigue strength of steel beams with welded stiffeners and attachments, NCHRP report, 1974, 147; both of which are hereby incorporated by reference herein in their entireties). On the other hand, the stress range in the girder flanges and the end cross-frame elements are minor and below the threshold of fatigue consideration, and will not cause any fatigue issues. This can be attributed to the following three reasons. First, there is no differential vertical deflection at the supports at the location of the end cross-frames. Second, the rotational deflection of steel girders is limited due to the presence of concrete (slab). Third, the contribution of the concrete deck to load-carrying capacity of girders as composite system reduces the stresses in the girder flanges. As such, implementing systems and methods of embodiments of the subject invention for end cross-frames will not have any fatigue issues. Embodiments of the subject invention can have a major impact and considerably improve the construction operation for skewed bridges, and can alleviate many of concerns related to skew connections.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for connecting a cross-frame to a girder, the system comprising:
   a first Tee section welded directly to the girder and comprising a first Tee section web and a first Tee section flange monolithically formed with the first Tee section web or connected directly with the first Tee section web,
   the first Tee section web being welded directly to a girder web of the girder,
   the first Tee section flange being welded directly to the girder web and welded directly to a girder flange of the girder, and
   the first Tee section web being physically spaced apart from the girder flange by a first Tee section main cut-out.

2. The system according to claim 1, further comprising a first cross-frame member welded directly to the first Tee section flange.

3. The system according to claim 1, further comprising a first connection plate welded directly to the first Tee section flange.

4. The system according to claim 3, further comprising a first cross-frame member welded directly to the first connection plate.

5. The system according to claim 1, the girder being a bridge girder of a skewed bridge.

6. The system according to claim 5, an angle between the first Tee section flange and a plane perpendicular to the girder web being equal to a skew angle between an end support of the skewed bridge and a line perpendicular to a longitudinal axis of the skewed bridge.

7. The system according to claim 1, the first Tee section web comprising a plurality of edge cut-outs along an edge of the first Tee section web, the edge of the first Tee section web being perpendicular to a surface of the girder flange to which the first Tee section flange is directly welded.

8. The system according to claim 1, the girder being an external girder of a skewed bridge, and
   a surface of the girder web to which the first Tee-section web is directly welded being an internal-facing girder web surface.

9. The system according to claim 1, the girder being an internal girder of a skewed bridge,
   the first Tee section web being welded directly to a first surface of the girder web of the girder,
   the first Tee section flange being welded directly to the first surface of the girder web,
   the system further comprising a second Tee section welded directly to the girder and comprising a second Tee section web and a second Tee section flange monolithically formed with the second Tee section web or connected directly with the second Tee section web,
   the second Tee section web being welded directly to a second surface of the girder web opposite from the first surface of the girder web,
   the second Tee section flange being welded directly to the second surface of the girder web and welded directly to the girder flange of the girder, and
   the second Tee section web being physically spaced apart from the girder flange by a second Tee section main cut-out.

10. The system according to claim 9, further comprising:
    a first cross-frame member connected by welding to the first Tee section flange; and
    a second cross-frame member connected by welding to the second Tee section flange.

11. The system according to claim 9, a first angle between the first Tee section flange and a plane perpendicular to the girder web being equal to a skew angle between an end support of the skewed bridge and a line perpendicular to a longitudinal axis of the skewed bridge, and
    a second angle between the second Tee section flange and the plane perpendicular to the girder web being equal to the skew angle.

12. The system according to claim 9, the first Tee section web comprising a plurality of first edge cut-outs along a first edge of the first Tee section web, the first edge of the first Tee section web being perpendicular to a surface of the girder flange to which the first Tee section flange is directly welded, and the second Tee section web comprising a plurality of second edge cut-outs along a second edge of the second Tee section web, the second edge of the second Tee section web being perpendicular to a surface of the girder flange to which the second Tee section flange is directly welded.

13. A method for connecting a cross-frame to a girder, the method comprising:

welding a first Tee section directly to the girder, the first Tee section comprising a first Tee section web and a first Tee section flange monolithically formed with the first Tee section web or connected directly with the first Tee section web, the first Tee section web being welded directly to a girder web of the girder, the first Tee section flange being welded directly to the girder web and welded directly to a girder flange of the girder, the first Tee section web being physically spaced apart from the girder flange by a first Tee section main cut-out.

14. The method according to claim 13, further comprising connecting a first cross-frame member to the first Tee section flange by welding.

15. The method according to claim 13, the girder being a bridge girder of a skewed bridge, an angle between the first Tee section flange and a plane perpendicular to the girder web being equal to a skew angle between an end support of the skewed bridge and a line perpendicular to a longitudinal axis of the skewed bridge.

16. The method according to claim 13, the first Tee section web comprising a plurality of edge cut-outs along an edge of the first Tee section web, the edge of the first Tee section web being perpendicular to a surface of the girder flange to which the first Tee section flange is directly welded.

17. The method according to claim 13, the girder being an internal girder of a skewed bridge, the first Tee section web being welded directly to a first surface of the girder web of the girder, the first Tee section flange being welded directly to the first surface of the girder web, the method further comprising welding a second Tee section directly to the girder, the second Tee section comprising a second Tee section web and a second Tee section flange monolithically formed with the second Tee section web or connected directly with the second Tee section web, the second Tee section web being welded directly to a second surface of the girder web opposite from the first surface of the girder web, the second Tee section flange being welded directly to the second surface of the girder web and welded directly to the girder flange of the girder, the second Tee section web being physically spaced apart from the girder flange by a second Tee section main cut-out.

18. The method according to claim 17, further comprising:

connecting a first cross-frame member to the first Tee section flange by welding; and connecting a second cross-frame member to the second Tee section flange by welding.

19. The method according to claim 17, a first angle between the first Tee section flange and a plane perpendicular to the girder web being equal to a skew angle between an end support of the skewed bridge and a line perpendicular to a longitudinal axis of the skewed bridge, and a second angle between the second Tee section flange and the plane perpendicular to the girder web being equal to the skew angle.

20. A system for connecting a cross-frame to a girder, the system comprising:

a first Tee section welded directly to the girder and comprising a first Tee section web and a first Tee section flange monolithically formed with the first Tee section web or connected directly with the first Tee section web;

a second Tee section welded directly to the girder and comprising a second Tee section web and a second Tee section flange monolithically formed with the second Tee section web or connected directly with the second Tee section web;

a first cross-frame member connected by welding to the first Tee section flange; and a second cross-frame member connected by welding to the second Tee section flange, the first Tee section web being welded directly to a first surface of a girder web of the girder, the first Tee section flange being welded directly to the first surface of the girder web and welded directly to a girder flange of the girder, the first Tee section web being physically spaced apart from the girder flange by a first Tee section main cut-out, the second Tee section web being welded directly to a second surface of the girder web opposite from the first surface of the girder web, the second Tee section flange being welded directly to the second surface of the girder web and welded directly to the girder flange of the girder, the second Tee section web being physically spaced apart from the girder flange by a second Tee section main cut-out, the girder being an internal bridge girder of a skewed bridge, a first angle between the first Tee section flange and a plane perpendicular to the girder web being equal to a skew angle between an end support of the skewed bridge and a line perpendicular to a longitudinal axis of the skewed bridge, a second angle between the second Tee section flange and the plane perpendicular to the girder web being equal to the skew angle the first Tee section web comprising a plurality of first edge cut-outs along a first edge of the first Tee section web, the first edge of the first Tee section web being perpendicular to a surface of the girder flange to which the first Tee section flange is directly welded, and the second Tee section web comprising a plurality of second edge cut-outs along a second edge of the second Tee section web, the second edge of the second Tee section web being perpendicular to a surface of the girder flange to which the second Tee section flange is directly welded.

* * * * *